United States Patent
Mochizuki et al.

(10) Patent No.: US 9,555,515 B2
(45) Date of Patent: Jan. 31, 2017

(54) MACHINE TOOL SPINDLE DEVICE

(71) Applicant: DMG MORI CO., LTD., Nara (JP)

(72) Inventors: Akihiro Mochizuki, Nara (JP); Syunsuke Nakazawa, Nara (JP)

(73) Assignee: DMG MORI CO., LTD., Yamatokoriyama-Shi, Nara (JP)

( * ) Notice: Subject to any disclaimer, the term of this patent is extended or adjusted under 35 U.S.C. 154(b) by 0 days.

(21) Appl. No.: 14/854,884

(22) Filed: Sep. 15, 2015

(65) Prior Publication Data

US 2016/0074981 A1 Mar. 17, 2016

(30) Foreign Application Priority Data

Sep. 16, 2014 (JP) .................................. 2014-187712

(51) Int. Cl.
*B23Q 11/10* (2006.01)
*B23Q 11/00* (2006.01)
*B23Q 11/12* (2006.01)

(52) U.S. Cl.
CPC ......... *B23Q 11/1015* (2013.01); *B23Q 11/005* (2013.01); *B23Q 11/127* (2013.01); *Y10T 409/303976* (2015.01); *Y10T 409/304032* (2015.01); *Y10T 409/304088* (2015.01); *Y10T 409/309464* (2015.01)

(58) Field of Classification Search
CPC . B23Q 11/1015; B23Q 11/005; B23Q 11/127; Y10T 409/303976; Y10T 409/304032; Y10T 409/304088; Y10T 409/309464
See application file for complete search history.

(56) References Cited

U.S. PATENT DOCUMENTS 6,582,167 B1 * 6/2003 Sugata ................. B23B 31/261
408/59

FOREIGN PATENT DOCUMENTS

| JP | H01-092048 A | 4/1989 |
| JP | H07-024687 A | 1/1995 |
| JP | H10-080839 A | 3/1998 |
| JP | 2007-307651 A | 11/2007 |
| JP | 2007-307679 A | 11/2007 |

OTHER PUBLICATIONS

English Abstract and Machine Translation for JPH07-024687 Publication Date: Jan. 27, 1995.

(Continued)

*Primary Examiner* — Sunil K Singh
*Assistant Examiner* — Alan Snyder
(74) *Attorney, Agent, or Firm* — IP Business Solutions, LLC (57) ABSTRACT

In a machine tool spindle device, a draw bar is arranged inside a center hole of a spindle, and a disc spring is arranged inside a spring member arrangement space between the draw bar and the center hole. A draw bar inner pipe is inserted inside a through hole of the draw bar, and the interior of the draw bar inner pipe is used as a coolant passage. A gap between the draw bar inner pipe and the through hole is used as an air passage for supplying the purge air, and the interior of the spring member arrangement space is used as a coolant supply passage for supplying coolant to cooling jackets of the spindle.

5 Claims, 8 Drawing Sheets (56) References Cited

OTHER PUBLICATIONS

English Abstract for JPH01-092048, Publication Date: Apr. 11, 1989.
English Abstract and Machine Translation for JPH10-080839 Publication Date: Mar. 31, 1998.
English Abstract and Machine Translation for JP2007-307651 Publication Date: Nov. 29, 2007.
English Abstract and Machine Translation for JP2007-307679 Publication Date: Nov. 29, 2007.

* cited by examiner

MACHINE TOOL SPINDLE DEVICE

CROSS-REFERENCE TO RELATED APPLICATIONS

The present application claims priority under 35 U.S.C. 119 to Japanese Patent Application No. 2014-187712, filed on Sep. 16, 2014, the content of which is incorporated herein by reference in its entirety.

BACKGROUND OF THE INVENTION

Field of the Invention

The present invention relates to a machine tool spindle device, and more specifically, relates to a spindle device equipped with a system for supplying coolant to a spindle bearing part, a system for supplying coolant to a processing point, and a system for supplying purge air to a tapered bore of a tool holder lock.

Description of the Related Art

A machine tool spindle device has a constitution with the spindle installed so as to be freely rotatable inside a spindle head, and with a draw bar installed inside the spindle energized in the tool holder locking direction by a disc spring. With this spindle device, when thermal expansion in the radial direction of the spindle becomes large, the durability of the spindle bearing decreases, so to prevent this, conventionally, the spindle is cooled, coolant is supplied to the processing point, and chips adhered to the tapered bore of the tool holder locking are removed.

For example, the disc spring arrangement space or draw bar center hole are used as flow paths for coolant or coolant as disclosed by Japanese Patent Application Laid-Open Publication Nos. H07-024687, H01-092048, and H10-080839. Further, an air passage is provided to communicate from the spindle side surface to the tapered bore as disclosed by, for example, Japanese Patent Application Laid-Open Publication No. H07-024687. Further, a washing passage is branched so as to have communication from the coolant flow path of the draw bar center hole to the tapered bore as disclosed by, for example, Japanese Patent Application Laid-Open Publication Nos. 2007-307651 and 2007-307679.

With the machine tool spindle device, it is preferable to provide passages for three systems including for coolant for cooling the spindle bearing part, coolant for cooling the processing point, and air for removing chips. By combining the constitutions noted in each of the publications noted above, it is possible to realize a spindle device equipped with the three system passages. However, there is concern about the spindle device becoming larger due to issues with the combined structure.

The description herein of advantages and disadvantages of various features, embodiments, methods, and apparatus disclosed in other publications is in no way intended to limit the present invention. For example, certain features of the preferred described embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The disclosed embodiments of the present invention have been developed in view of the above-mentioned and/or other problems in the related art. The disclosed embodiments of the present invention can significantly improve upon existing methods and/or apparatuses.

The present invention was created considering the conventional status noted above, and an object is to provide a compact machine tool spindle device equipped with passages for three systems without causing it to become larger.

In some embodiments of the present disclosure, a machine tool spindle device is equipped with a spindle head, a spindle that is arranged inside the spindle head, and is axially supported to be freely rotatable in the spindle head via a spindle bearing, having a tapered bore for which a tool holder is engaged on the tip end part, a draw bar that is arranged inside a center hole of the spindle, that locks and unlocks the tool holder with the tapered bore, and a spring member that is arranged in a spring member arrangement space between the draw bar and the center hole, which energizes the draw bar in the locking direction. A draw bar inner pipe is inserted inside a through hole of the draw bar, and the interior of the draw bar inner pipe is used as a coolant passage for supplying coolant to a processing point, a gap between the draw bar inner pipe and the through hole is used as an air passage for supplying purge air for removing chips adhered to the tapered bore, and the interior of the spring member arrangement space is used as a coolant supply passage for supplying coolant to a cooling jacket formed on the bearing part of the spindle.

In some embodiments of the present disclosure, in the machine tool spindle device as recited above, a spindle inner pipe constituting the spring member arrangement space with the draw bar is inserted inside the center hole of the spindle, and the gap between the spindle inner pipe and the spindle is used as a coolant exhaust passage for exhausting coolant supplied to the cooling jacket.

In some embodiments of the present disclosure, in the machine tool spindle device as recited above, a rotating body side part and a non-rotating body side part of the coolant passage and a coolant supply passage are connected in the axial direction.

In some embodiments of the present disclosure, in the machine tool spindle device as recited above, a chamber is provided in the connection part of the rotating body side part and the non-rotating body side part of the coolant supply passage.

In some embodiments of the present disclosure, in the machine tool spindle device as recited above, the coolant exhaust passage is suctioned by using a pump.

According to some embodiments as recited above, since the interior of the draw bar inner pipe inserted in the through hole of the draw bar is used as the coolant passage, the gap between the draw bar inner pipe and the through hole of the draw bar is used as the air passage, and the interior of the spring arrangement space is used as the coolant supply passage, in other words, since the passages of the three systems including the coolant passage, the air passage, and the coolant supply passage are all formed inside the spindle, it is possible to provide passages of three systems without making the spindle device large.

According to some embodiments as recited above, since the gap between the spindle inner pipe inserted in the center hole of the spindle and the center hole of the spindle is used as the coolant exhaust passage, in other words, since the passages for all four systems were formed inside the spindle, it is possible to provide the passages of four systems without making the spindle device large.

Further, since the coolant supply passage is installed at the radial direction inside and the coolant exhaust passage is installed at the radial direction outside, the centrifugal force received by the coolant inside the coolant supply passage is small, and the centrifugal force received by the coolant inside the coolant exhaust passage is large, and therefore, it is possible to perform coolant supply and exhaust smoothly.

According to some embodiments as recited above, the coolant passage and cooing liquid supply passage rotating body side part and non-rotating body side part are connected in the axial direction, so compared to when they are connected in the radial direction, there is less effect by the centrifugal force, so it is possible to supply coolant and coolant even with relatively low pressure.

According to some embodiments as recited above, the coolant supply passage rotating body side part and non-rotating body side part have a chamber provided in the connection part, so it is possible to inhibit shearing resistance that occurs with coolant at the connection part, and from that point as well, it is possible to supply coolant with low pressure.

According to some embodiments as recited above, the coolant exhaust passage is suctioned using a pump, so the pressure inside the coolant supply passage and the exhaust passage becomes lower, and it is possible to supply coolant at an even lower pressure.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/ or advantages of particular embodiments should not be construed as limiting other embodiments or the claims. In the drawings, the size and relative sizes of layers and regions may be exaggerated for clarity. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise.

As used herein, the term "and/or" includes any and all combinations of one or more of the associated listed items and may be abbreviated as "/". It will be understood that, although the terms first, second, etc. may be used herein to describe various elements, these elements should not be limited by these terms. Unless indicated otherwise, these terms are only used to distinguish one element from another. For example, a first object could be termed a second object, and, similarly, a second object could be termed a first object without departing from the teachings of the disclosure. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct contact (i.e., touching) unless the context indicates otherwise. Terms such as "same," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

BRIEF DESCRIPTION OF THE DRAWINGS

The disclosed embodiments of the present invention are shown by way of example, and not limitation, in the accompanying figures.

DETAILED DESCRIPTION

In the following paragraphs, some embodiments of the invention will be described by way of example and not limitation. It should be understood based on this disclosure that various other modifications can be made by those in the art based on these illustrated embodiments.

Hereinafter, embodiments of the present invention will be described based on the attached drawings.

Embodiment 1

FIG. 1 to FIG. 5 are drawings for describing the machine tool spindle device of embodiment 1 of the present invention.

Figure 1:
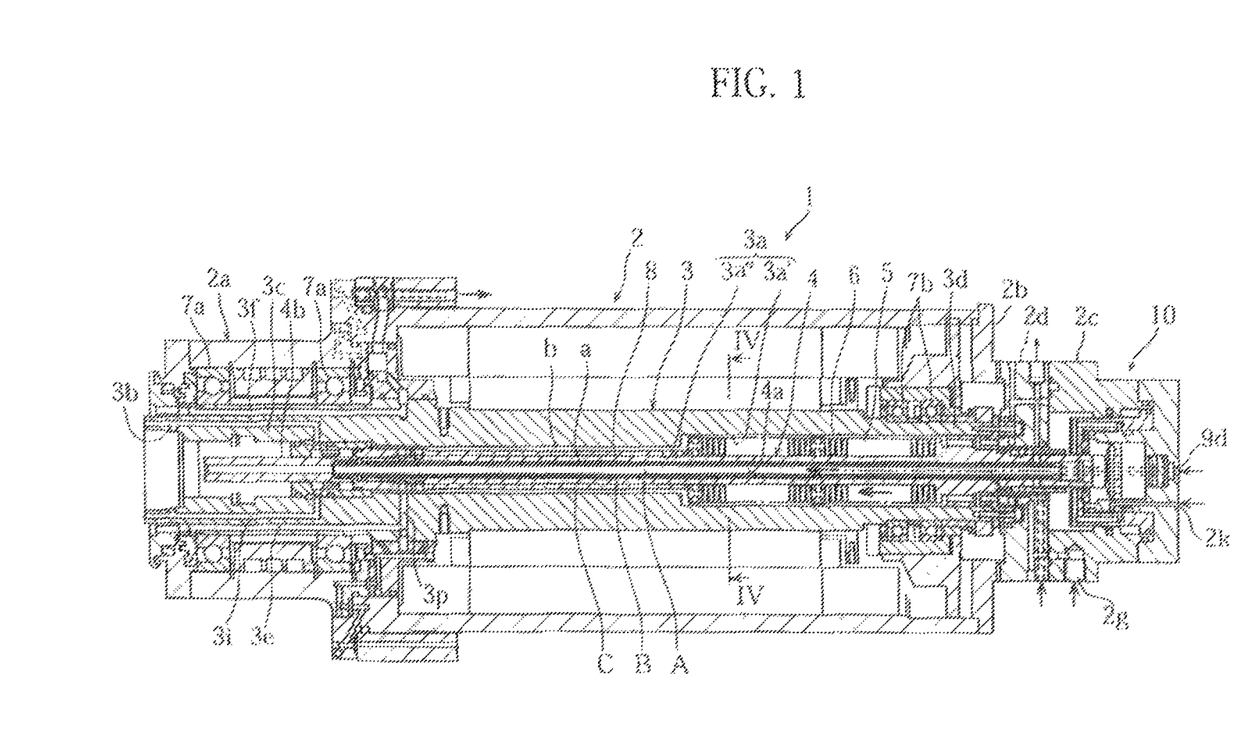
FIG. 1 is a cross section side view of the machine tool spindle device according to embodiment 1 of the present invention.

In the drawings, 1 is a machine tool spindle device. This spindle device 1 has a spindle head 2 supported to be able to move in the axial direction, for example, on a column disposed on a bed, a spindle 3 inserted and arranged so as to be freely rotatable inside the spindle head 2, a draw bar 4 for locking and unlocking a tool holder T that is inserted and arranged to be able to rotate together with the spindle 3 and able to move in the axial direction inside a center hole 3a consisting of a large diameter part 3a' and a small diameter part 3a" of the spindle 3, and a disc spring 6 that is arranged inside a spring member arrangement space 5 formed by the draw bar 4 and the large diameter part 3a' of the center hole 3a of the spindle 3 and energizes the draw bar 4 in the locking direction.

A front bearing fitted part 2a is formed at the front part of the spindle head 2, a rear bearing fitted part 2b is formed at the rear part, and furthermore, a passage forming plate 2d and an unlocking casing 2c are connected at the rear bearing fitted part 2b.

The spindle 3 is a tube shaped item having a center hole 3a, for which a tapered bore 3b with which the tool holder T engages is formed at the tip end of the bearing fitted part 3c, the bearing fitted part 3c is axially supported by the front bearing fitted part 2a via a front part bearing 7a, and the rear part 3d is axially supported by a rear bearing fitted part 2b via a rear part bearing 7b.

Figure 3:
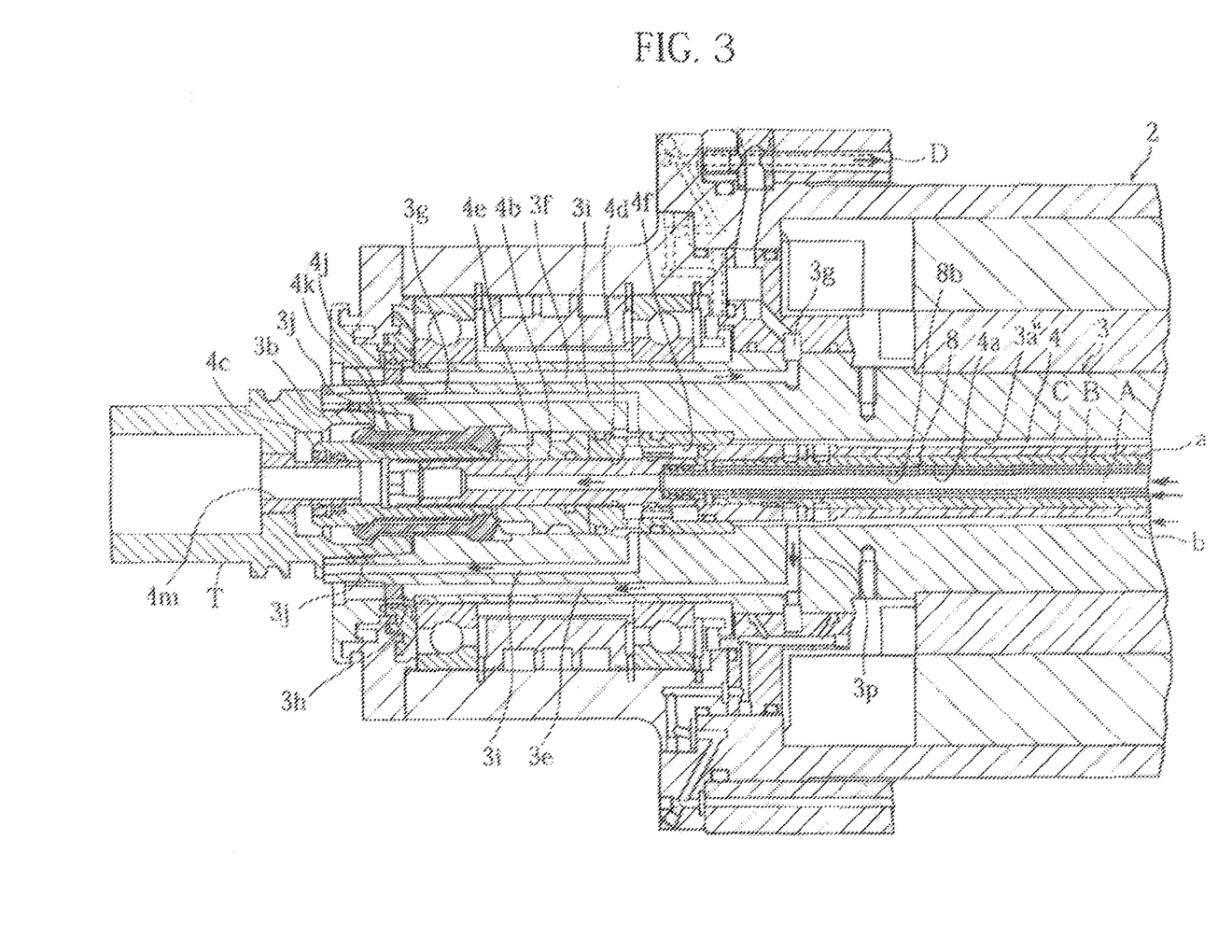
FIG. 3 is a cross section side view around the spindle bearing part of the spindle device.

Also, a plurality of supply side cooling holes 3e and a plurality of exhaust side cooling holes 3f are formed extending in the axial direction constituting the cooling jacket on the bearing fitted part 3c of the spindle 3. The supply side cooling holes 3e and the exhaust side cooling holes 3f are in communication with each other via an annular groove 3h formed on the front end part of the spindle 3, and furthermore, the exhaust side cooling holes 3f are connected to an annular groove 3g formed at the boundary of the spindle head 2 and the spindle 3.

Also, a plurality of purge air holes 3i are formed so as to extend in the axial direction on the bearing fitted part 3c of the spindle 3, and each purge air hole 3i opens at the tapered bore 3b using branch holes 3j.

The draw bar 4 forms a tube shape having a through hole 4a, and the connecting pipe 4b fixed to the tip end part of the draw bar 4 is supported so as to be able to move in the axial direction by a front support member 4d arranged at the front part of the spindle 3. A relay space 4f is formed by this front support member 4d and the connecting pipe 4b, and the relay space 4f is in communication with the purge air holes 3i. Furthermore, the locking member 4c that locks and unlocks the tool holder T in relation to the tapered bore 3b is connected to the connecting pipe 4b.

Also, the rear part of the draw bar 4 is supported to be able to move in the axial direction by a tube part 3m of a rear support member 3k fixed to the rear end part of the spindle 3, and the tube part 3m is inserted to be able to rotate inside a support hole 2j formed on the passage forming plate 2d.

Figure 2:
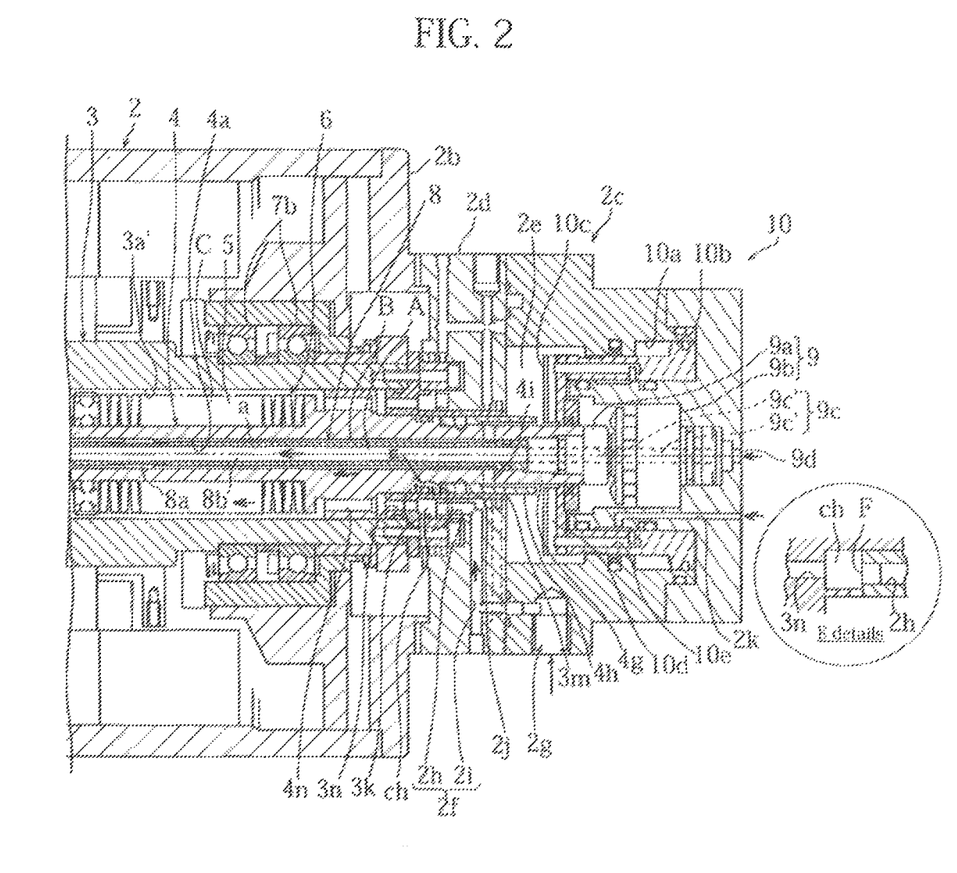
FIG. 2 is a cross section side view around the unlocking mechanism of the spindle device.

Also, a rotary joint 9 is connected to a rear end part 4g of the draw bar 4. This rotary joint 9 is constituted by a cap 9a that is engaged and inserted in the rear end part 4g of the draw bar 4 and rotates together with the draw bar 4, and a joint main unit 9b that is in sliding contact with the rear end surface of the cap 9a supported in a non-rotating state on the unlocking casing 2c. A communication hole 9c that is in communication with a center hole 8b of the draw bar inner pipe 8 described later is formed by piercing on the rotary joint 9.

Also, an unlocking mechanism 10 is installed on the interior of the unlocking casing 2c. This unlocking mechanism 10 has a constitution for which a piston 10b is inserted and arranged inside a cylinder hole 10a formed on the unlocking casing 2c, and a pressing plate 10c is fixed to the tip end of the piston 10b. The pressing plate 10c faces opposite an annular member 4h fixed to the rear end part of the draw bar 4 inside a movable space 2e formed inside the unlocking casing 2c. When the piston 10b moves forward, the pressing plate 10c moves the draw bar 4 in the unlocking direction.

Also, a gap a is opened so that the draw bar inner pipe 8 is inserted and arranged inside the through hole 4a of the draw bar 4. The tip end of the draw bar inner pipe 8 is inserted inside the connecting pipe 4b of the draw bar 4, and the center hole 8b of the draw bar inner pipe 8 is in communication with the center hole 4e of the connecting pipe 4b. Also, the rear end of the center hole 8b of the draw bar inner pipe 8 is in sliding contact with the cap 9a of the rotary joint 9 and is in communication with the communication hole 9c.

Figure 4:
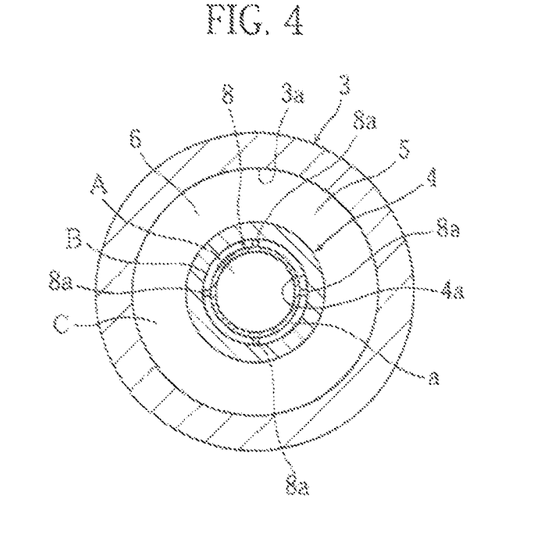
FIG. 4 is a cross section front view of the spindle device (cross section view of line IV-IV in FIG. 1).

Also, at the outer circumference of the draw bar inner pipe 8, a plurality of convex parts 8a for maintaining the gap a are formed opening a gap in the circumference direction and the axial direction.

The front end part of the gap a is in communication with the relay space 4f of the front support member 4d, and the relay space 4f is in communication with the air purge hole 3i formed on the bearing fitted part 3c of the spindle 3.

The front end part of the small diameter part 3a" of the center hole 3a of the spindle 3 is connected in communication with the supply side cooling hole 3e via the communication hole 3b formed in the radial direction on the spindle 3. Also, the rear end part of the large diameter part 3a' of the center hole 3a is in communication with the coolant supply port 2g formed on the unlocking casing 2c via the communication hole 4i formed in the axial direction on the rear part of the draw bar 4, the communication hole 3n formed on the rear support member 3k, and the communication hole 2f formed on the passage forming plate 2d. The communication hole 2f of the passage forming plate 2d is constituted by an axial direction hole 2h extending in the axial direction and a radial direction hole 2i extending in the radial direction.

Also, the center hole 8b of the draw bar inner pipe 8 is used as the coolant passage A for supplying coolant to the processing point. The rear end of the coolant passage A is connected to the coolant supply port 9d via the communication hole 9c inside the rotary joint 9, and the supply port 9d is connected to the coolant supply source. Also, the front end of the coolant passage A is in communication with the center hole of the tool holder T via the center hole 4e of the connecting pipe 4b.

Also, a gap a between the draw bar inner pipe 8 and the through hole 4a of the draw bar 4 is used as the air passage B for supplying purge air for removing chips adhered to the tapered bore 3b. The rear end of the air passage B opens to the movable space 2e via the communication hole 4i formed on the draw bar 4, and from here, is connected to the air supply source via communication holes 10d, 10e, and 2k formed on the pressing plate 10c, the piston 10b, and the unlocking casing 2c.

Furthermore, the spring member arrangement space 5 is used as the coolant supply passage C for supplying coolant to the front part bearing 7a part of the spindle 3. The front part of the coolant supply passage C is constituted by a gap b between the small diameter part 3a" of the center hole 3a and the through hole 4a of the draw bar 4. Then, the front end part of this gap b is connected to the supply side cooling hole (cooling jacket) 3e by the communication hole 3p formed in the radial direction on the spindle 3.

Here, the rotating body side part of this coolant passage A, in other words the part formed on the cap 9a of the rotary joint 9, and the non-rotating body side part, in other words the part formed on the joint main unit 9b of the rotary joint 9, are connected in the axial direction.

Also, the gap a between the draw bar inner pipe 8 and the through hole 4a of the draw bar 4 is used as the air passage B for supplying purge air for removing chips adhered to the tapered bore 3b. The rear end of the air passage B opens to the movable space 2e via the communication hole 4i formed in the radial direction on the draw bar 4, and from here, is connected to the communication holes 10d, 10e, and 2k formed on the pressing plate 10c, the piston 10b, and the rear end member 2c.

Furthermore, the spring member arrangement space 5 is used as the coolant supply passage C for supplying coolant to the front part bearing 7a part of the spindle 3. The front part of the coolant supply passage C is constituted by the gap b between the small diameter part 3a" of the center hole 3a and the draw bar 4. Also, this gap b is in communication with the supply side cooling hole 3e by the communication hole 3p formed in the radial direction on the spindle 3.

Also, the rotating body side part of the rear end part of the coolant supply passage C, specifically, the communication hole 3n formed on the rear support member 3k, and the non-rotating body side part, specifically, the axial direction hole 2h of the communication hole 2f formed on the passage forming plate 2d, are connected in the axial direction. Also, at this connection part, a chamber ch having a relatively large capacity is formed.

Figure 5:
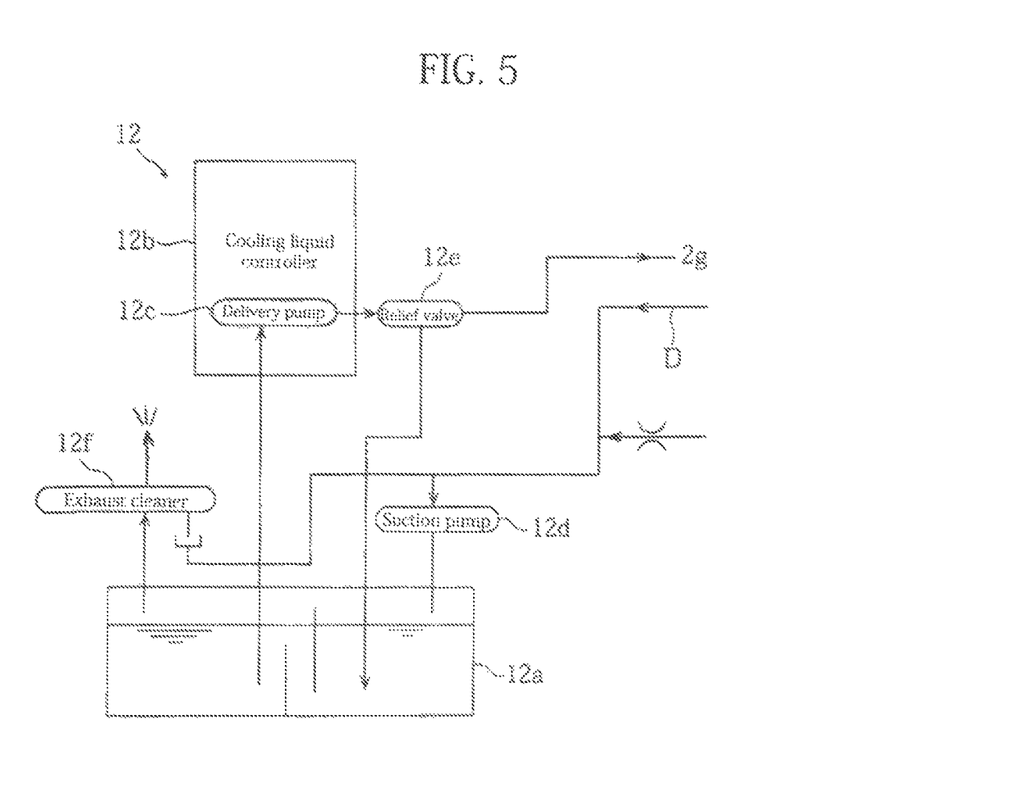
FIG. 5 is a block constitution diagram of the coolant supply source of the spindle device.

Here, in FIG. 5, reference number 12 is a coolant supply device, and the supply device 12 is equipped with a coolant controller 12b that controls the coolant supply volume and supply pressure or suction pressure, and pressurizes the coolant inside a storage tank 12a by a delivery pump 12c, and while regulating the delivery pressure using a relief valve 12e, supplies it to the coolant supply port 2g. Also, the annular groove 3g formed on the front end part of the spindle 3 is put in communication with the storage tank 12a via the exhaust passage D, and the exhaust side cooling hole 3f is made to be suctioned via the exhaust passage D using a suction pump 12d interposed in the exhaust passage D. The reference number 12f is an exhaust cleaner, and to avoid raising the internal pressure of the storage tank 12a, the exhaust cleaner 12f removes the oil content of the tank internal atmosphere and releases it to the air, and also acts so as to return the oil content to inside the storage tank 12a.

With embodiment 1, since the interior of the draw bar inner pipe 8 inserted inside the through hole 4a of the draw bar 4 is used as the coolant passage A, the gap a between the draw bar inner pipe 8 and the through hole 4a of the draw bar 4 is used as the air passage B, and the spring member arrangement space 5 is used as the coolant supply passage C, in other words, since all of the passages of three systems including the coolant passage A, the air passage B, and the coolant supply passage C are formed inside the spindle 3, it is possible to avoid the spindle device 1 becoming large while providing passages for three systems.

Also, the rotating body side part and the non-rotating body side part of the coolant passage A and the coolant supply passage C are connected in the axial direction, so compared to when connected in the radial direction, there is not such a strong effect by centrifugal force, so it is possible to supply coolant and coolant with relatively low pressure.

Furthermore, a chamber ch is provided on the connection part of the rotating body side part and the non-rotating body side part of the coolant passage A and the coolant supply passage C, so it is possible to inhibit shearing resistance that occurs with the coolant and coolant at the connection part, and from that point as well, it is possible to supply coolant and coolant using relatively low pressure.

Also, the coolant exhaust passage D is suctioned using the pump 12d, so it is possible to supply coolant at even lower pressure.

Embodiment 2

Figure 6:
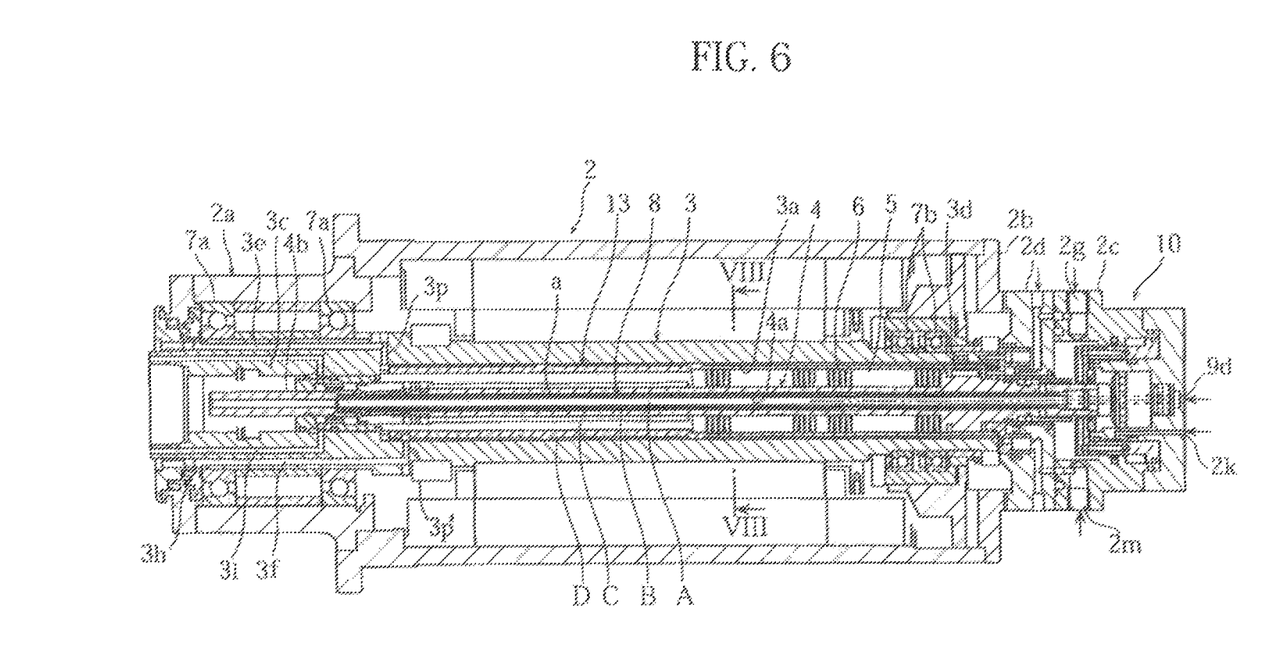
FIG. 6 is a cross section side view of the machine tool spindle device of embodiment 2 of the present invention.
Figure 7:
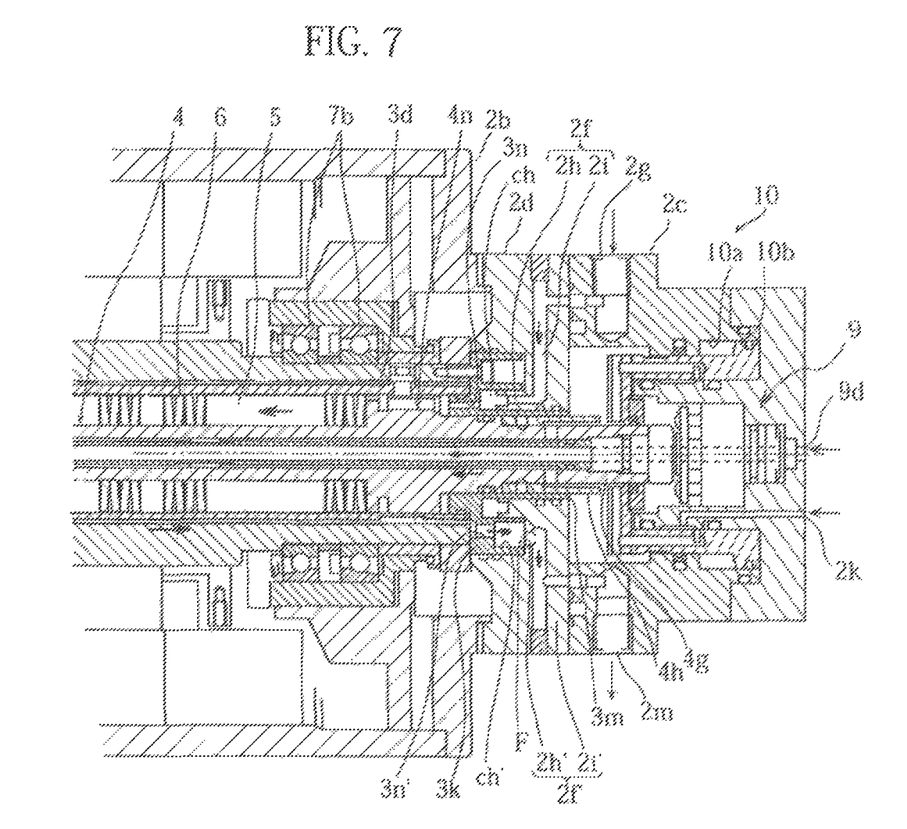
FIG. 7 is a cross section side view around the unlocking mechanism of the spindle device of embodiment 2.
Figure 8:
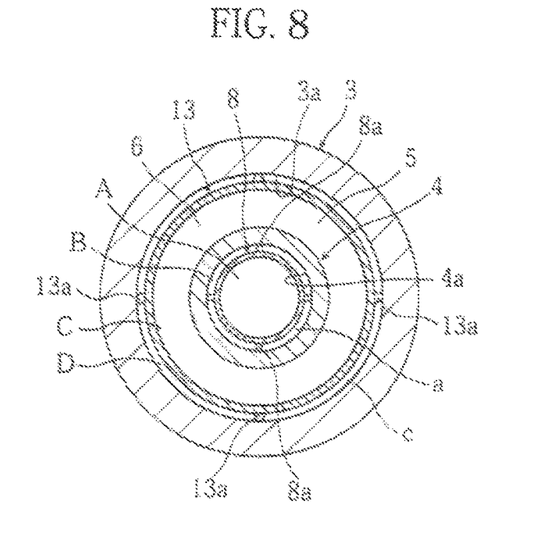
FIG. 8 is a cross section front view of the spindle device of embodiment 2 (cross section view of line VIII-VIII in FIG. 6).

FIG. 6 to FIG. 8 are drawings for describing the machine tool spindle device of embodiment 2 of the present invention. In the drawings, the same reference numbers as FIG. 1 to FIG. 5 are shown for the same or correlating parts.

With embodiment 2, the spindle inner pipe 13 that constitutes the spring member arrangement space 5 with the draw bar 4 is inserted on the inside of the center hole 3a of the spindle 3, and the gap between the spindle inner pipe 13 and the center hole 3a of the spindle 3 is used as the coolant exhaust passage D for exhausting the coolant, which is supplied to the supply side cooling hole (cooling jacket) 3e, via the exhaust side cooling hole (cooling jacket) 3f.

Also, the communication hole 3n' formed on the rotating body side part of the rear end part of the coolant exhaust passage D, specifically, the rear support member 3k, and the axial direction hole 2h' of the communication hole 2f' formed on the non-rotating body side part, specifically, the passage forming plate 2d, are connected in the axial direction. Also, a chamber ch' having a relatively large capacity is formed on this connecting part.

With embodiment 2, since the gap between the spindle inner pipe 13 inserted inside the center hole 3a of the spindle 3 and the spindle 3 is used as the coolant exhaust passage D, in other words, since the passages of four systems are all formed inside the spindle 3, it is possible to avoid making the spindle device large while providing passages of four systems.

Also, with embodiment 2, the coolant supply passage C is installed in the radial direction inside, and the coolant exhaust passage D is installed in the radial direction outside, so the coolant inside the coolant exhaust passage D receives even greater centrifugal force, and because of this, the coolant is pressed out from the supply passage C to the exhaust passage D side, and as a result, supply and exhaust of coolant is smooth.

The terms and descriptions used herein are used only for explanatory purposes and the present invention is not limited to them. Accordingly, the present invention allows various design-changes falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, the terminology "present invention" or "invention" is meant as a non-specific, general reference and may be used as a reference to one or more aspects within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A machine tool spindle device comprising:
    a spindle head;
    a spindle that is arranged inside the spindle head, and is axially supported to be freely rotatable in the spindle head via a spindle bearing, having a tapered bore for which a tool holder is engaged on a tip end part;
    a draw bar that is arranged inside a center hole of the spindle, that locks and unlocks the tool holder with the tapered bore; and
    a spring member that is arranged in a spring member arrangement space between the draw bar and the center hole, which energizes the draw bar in the locking direction,
    wherein a draw bar inner pipe is inserted inside a through hole of the draw bar, and an interior of the draw bar inner pipe is used as a coolant passage for supplying coolant to a processing point, a gap between the draw bar inner pipe and the through hole of the draw bar is used as an air passage for supplying purge air for removing chips adhered to the tapered bore, and the interior of the spring member arrangement space is used as a coolant supply passage for supplying coolant to a cooling jacket formed on a bearing fitted part of the spindle.

2. The machine tool spindle device according to claim 1, wherein
    a spindle inner pipe constituting the spring member arrangement space with the draw bar is inserted inside the center hole of the spindle, and a gap between the spindle inner pipe and the center hole of the spindle is used as a coolant exhaust passage for exhausting coolant supplied to the cooling jacket.

3. The machine tool spindle device according to claim 1, wherein
    a rotating body side part of the coolant passage and a non-rotating body side part of the coolant passage are connected in an axial direction, and
    a rotating body side part of the coolant supply passage and a non-rotating body side part of the coolant supply passage are connected in the axial direction.

4. The machine tool spindle device according to claim 3, wherein
    a chamber is provided in a connection part of the rotating body side part and the non-rotating body side part of the coolant supply passage.

5. The machine tool spindle device according to any of claim 2, wherein the coolant exhaust passage is suctioned using a pump.

* * * * *

UNITED STATES PATENT AND TRADEMARK OFFICE
CERTIFICATE OF CORRECTION

PATENT NO. : 9,555,515 B2  
APPLICATION NO. : 14/854884  
DATED : January 31, 2017  
INVENTOR(S) : Akihiro Mochizuki et al.

Page 1 of 10

It is certified that error appears in the above-identified patent and that said Letters Patent is hereby corrected as shown below:

On the Title Page

Delete the title page and substitute therefore with the attached title page consisting of the corrected illustrated figure.

In the Drawings

Please replace FIGS. 1-8 with FIGS. 1-8 as shown on the attached pages.

Signed and Sealed this
Twenty-fourth Day of October, 2017

Joseph Matal
*Performing the Functions and Duties of the
Under Secretary of Commerce for Intellectual Property and
Director of the United States Patent and Trademark Office*

(12) United States Patent
Mochizuki et al.

(10) Patent No.: US 9,555,515 B2
(45) Date of Patent: Jan. 31, 2017

(54) MACHINE TOOL SPINDLE DEVICE

(71) Applicant: DMG MORI CO., LTD., Nara (JP)

(72) Inventors: Akihiro Mochizuki, Nara (JP); Syunsuke Nakazawa, Nara (JP)

(73) Assignee: DMG MORI CO., LTD., Yamatokoriyama-Shi, Nara (JP)

( * ) Notice: Subject to any disclaimer, the term of this patent is extended or adjusted under 35 U.S.C. 154(b) by 0 days.

(21) Appl. No.: 14/854,884

(22) Filed: Sep. 15, 2015

(65) Prior Publication Data
US 2016/0074981 A1 Mar. 17, 2016

(30) Foreign Application Priority Data
Sep. 16, 2014 (JP) ................. 2014-187712

(51) Int. Cl.
 *B23Q 11/10* (2006.01)
 *B23Q 11/00* (2006.01)
 *B23Q 11/12* (2006.01)

(52) U.S. Cl.
 CPC ......... *B23Q 11/1015* (2013.01); *B23Q 11/005* (2013.01); *B23Q 11/127* (2013.01); *Y10T 409/303976* (2015.01); *Y10T 409/304032* (2015.01); *Y10T 409/304088* (2015.01); *Y10T 409/309464* (2015.01)

(58) Field of Classification Search
 CPC . B23Q 11/1015; B23Q 11/005; B23Q 11/127; Y10T 409/303976; Y10T 409/304032; Y10T 409/304088; Y10T 409/309464
 See application file for complete search history.

(56) References Cited

U.S. PATENT DOCUMENTS 6,582,167 B1 * 6/2003 Sugata ............... B23B 31/261
408/59

FOREIGN PATENT DOCUMENTS

| JP | H01-092048 A | 4/1989 |
| JP | H07-024687 A | 1/1995 |
| JP | H10-080839 A | 3/1998 |
| JP | 2007-307651 A | 11/2007 |
| JP | 2007-307679 A | 11/2007 |

OTHER PUBLICATIONS

English Abstract and Machine Translation for JPH07-024687 Publication Date: Jan. 27, 1995.

(Continued)

*Primary Examiner* — Sunil K Singh
*Assistant Examiner* — Alan Snyder
(74) *Attorney, Agent, or Firm* — IP Business Solutions, LLC

(57) ABSTRACT

In a machine tool spindle device, a draw bar is arranged inside a center hole of a spindle, and a disc spring is arranged inside a spring member arrangement space between the draw bar and the center hole. A draw bar inner pipe is inserted inside a through hole of the draw bar, and the interior of the draw bar inner pipe is used as a coolant passage. A gap between the draw bar inner pipe and the through hole is used as an air passage for supplying the purge air, and the interior of the spring member arrangement space is used as a coolant supply passage for supplying coolant to cooling jackets of the spindle.

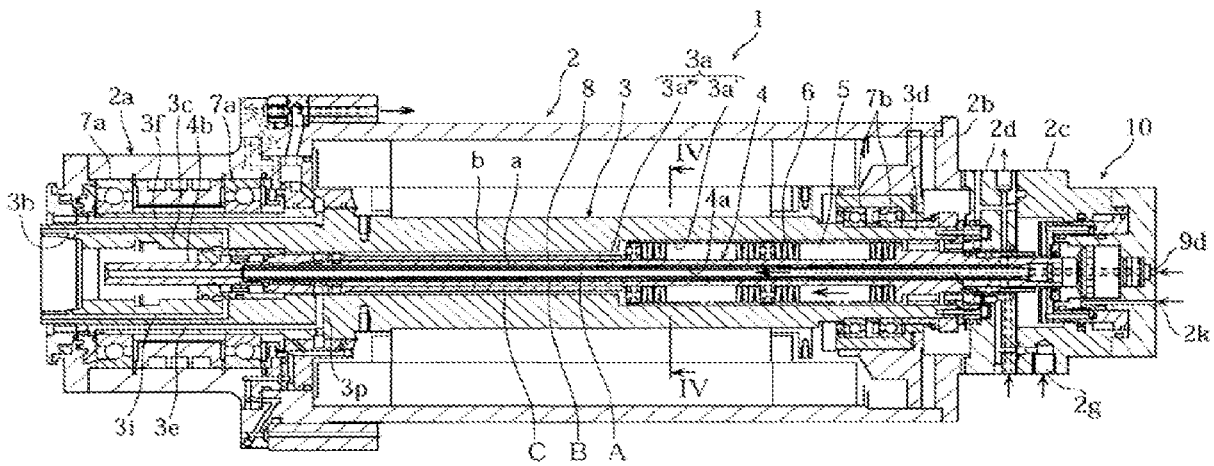

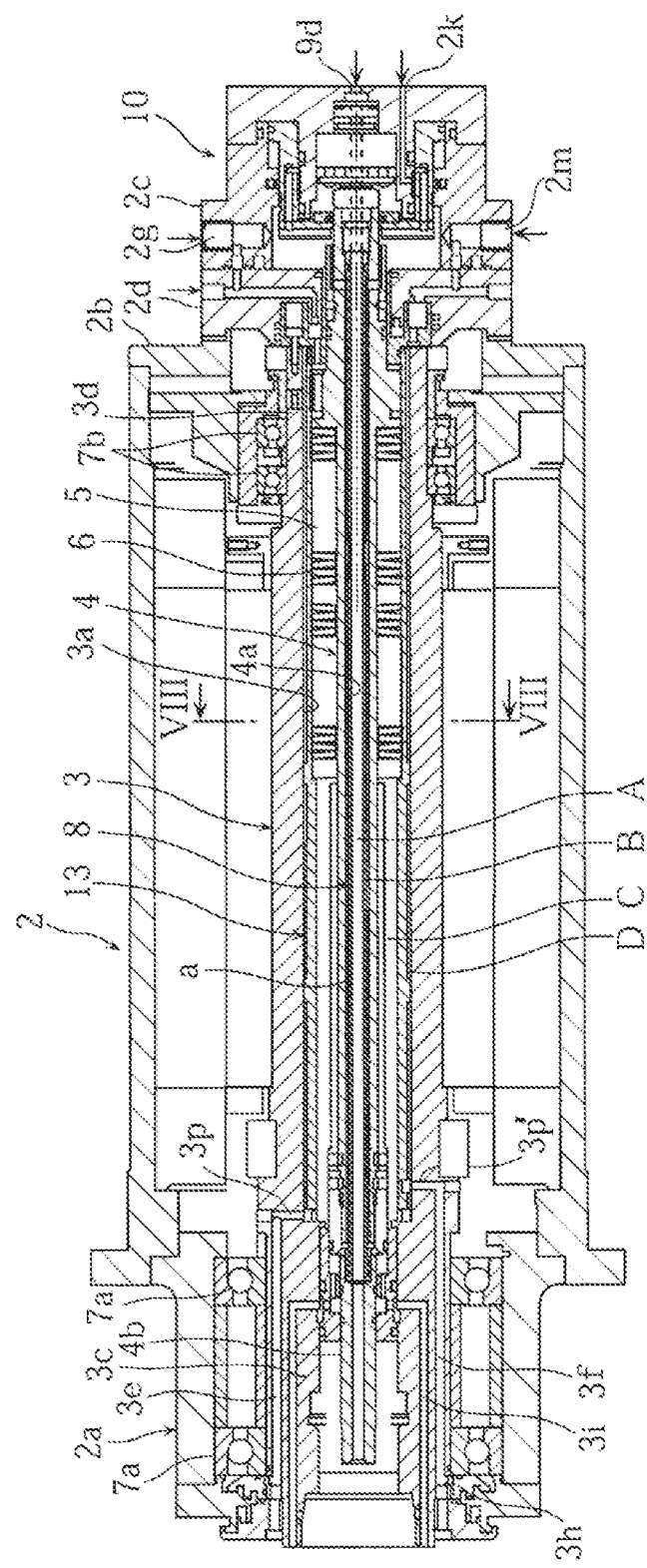

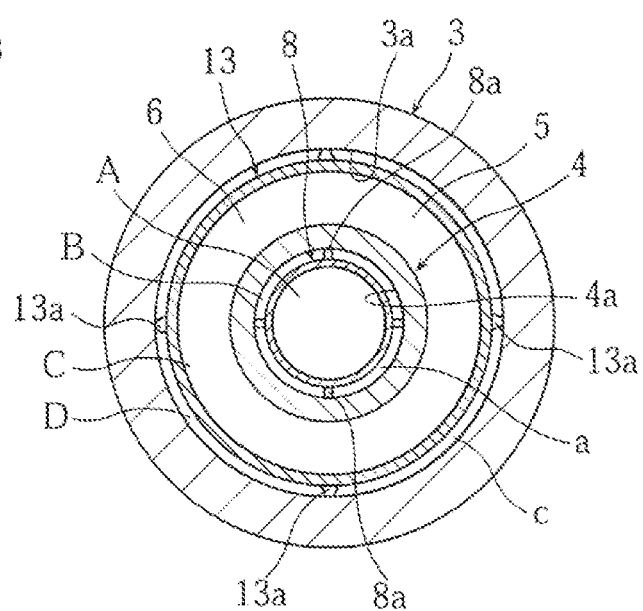

5 Claims, 8 Drawing Sheets